United States Patent [19]

Schrader et al.

[11] Patent Number: 4,859,863

[45] Date of Patent: Aug. 22, 1989

[54] LABEL INSPECTION APPARATUS SENSING REFLECTIVITY VALUES

[75] Inventors: Stephen A. Schrader, Bridgeton; Douglas J. Goff, Kirkwood, both of Mo.

[73] Assignee: Sonoco Products Company, Hartsville, S.C.

[21] Appl. No.: 142,800

[22] Filed: Jan. 11, 1988

[51] Int. Cl.[4] .......................... G06K 5/00; H04N 7/18

[52] U.S. Cl. ........................................ 250/556; 382/8; 358/106

[58] Field of Search ......................... 382/8, 28, 39, 48; 250/223 B, 562, 572, 223 R, 556; 209/528, 524; 358/106; 364/579

[56] References Cited

U.S. PATENT DOCUMENTS

| | | | |
|---|---|---|---|
| 4,414,566 | 11/1983 | Peyton et al. | 209/524 |
| 4,488,648 | 12/1984 | Claypool | 358/106 |
| 4,513,441 | 4/1985 | Henshaw | 250/562 |
| 4,691,231 | 9/1987 | Fitzmorris et al. | 250/223 B |
| 4,697,245 | 9/1987 | Kara et al. | 358/106 |
| 4,701,612 | 10/1987 | Sturgill | 358/106 |

*Primary Examiner*—David C. Nelms
*Assistant Examiner*—Michael Messinger
*Attorney, Agent, or Firm*—Rogers, Howell & Haferkamp

[57] ABSTRACT

A label inspection apparatus for inspecting labels on containers moving by a conveyor past the inspection apparatus senses the reflectivity values of pixels located over substantially the entire label for each container in a sample having a predetermined number of containers. The pixel locations are the same for each label in the sample and each label to be inspected, and the containers and labels in the sample are typical of those to be inspected. From the reflectivity values MEANS and standard deviation values are established for the containers in the sample. Limits by which containers to be inspected are to be judged as pass or fail are established as a function of the MEANS and standard deviations values. The reflectivity value in each pixel in each label to be inspected is sensed as with the containers in the sample, and a function of these values is compared with the estabilished limits, and from the comparison a label is passed or failed.

22 Claims, 4 Drawing Sheets

LABEL INSPECTION APPARATUS SENSING REFLECTIVITY VALUES

BACKGROUND AND SUMMARY OF THE INVENTION

This invention relates to an apparatus for inspecting labels applied to containers as they move on a conveyor line. More specifically the inspection given by the apparatus of this invention simulates a casual visual inspection that an average person might give the container. The purpose of this invention is not to detect every minute flaw in the label, but rather those flaws that the average person would detect with a casual visual inspection. The apparatus further includes means for rejecting or ejecting from the conveyor line those containers having labels found defective either as the result of label damage or as the result of errors in the application or positioning of the label on the container.

The label inspection apparatus of the present invention is particularly suited to inspect labels on bottles, such as for example blow molded plastic bottles, that are generally rectangular in horizontal cross-section in the label area and where the label is applied to a generally flat or slightly convex as opposed to a round side surface of the bottle. The inspection takes place automatically as the containers are moved by a conveyor without interruption of the conveyor line.

One practical adaptation of the present invention is for use in inspecting labels on one quart plastic motor oil bottles that normally have a height of six to eleven inches, a length of three to five inches, and a thickness of two to three and a half inches in the label area. These containers are rectangular in cross-section with slightly convex side panels to which the labels to be inspected are affixed. There may be a label on each of the two side panels. These labels may be affixed by adhesive or by heat transfer or other means. The labels are of various sizes and shapes usually related to the panel area available for their application. Portions of the container may appear in areas within the label outline.

Automatic label inspection devices are known in the art. For example, U.S. Pat. No. 4,270,863 discloses such a device. This patent describes a device for sorting good and bad bottles by comparing a camera's or diode array's view of the label against minimum and maximum values stored in memory arrays. These minimum and maximum values are obtained from a plurality of reference bottles which are placed before the sensor array by the operator and read by the device. The minimum and maximum light values received from each element of the sensor array from the reference bottles are stored in the memory arrays. The patent discloses various techniques for "scoring" the defects as determined by the minimum and maximum values. This device has disadvantages. It requires a number of manual operations and decisions by the operator including the placement of the reference bottles before the sensor arrays. In contrast, the device of the present invention includes just one operator control, a push button. The patent reference uses the minimum and maximum values as the limits for accepting or rejecting containers. The device of the present invention samples a number of containers and uses a statistical analysis calculating the mean and standard deviation for each pixel or sensor reading. Limits are generated that statistically describe an entire population (production run) of readings based on the sample population. Other examples of label inspection devices are described in U.S. Pat. Nos. 3,553,041, 4,589,141, 4,311,914, and 4,244,650.

In addition to the advantages previously mentioned, the present invention also has the capability to inspect labels with the stretch-and-shrink problem generated by the heat transfer label applicators and also labels of metal foil or other highly reflective metalized paper surfaces. The hardware and software of the present invention, using statistical techniques, provide adequate inspection for such labels and determine the inspection technique that will work best for the particular type label.

The inspection label device of the present invention inspects labels on containers moving on a conveyor past the inspection station. The movement of the conveyor is monitored by an incremental encoder that outputs an electrical pulse to a microprocessor unit for each small increment of conveyor travel. As a container enters the apparatus, its presence is first detected by a photodetector connected to an amplifier/comparator on the microprocessor unit. The apparatus has lamps for illuminating the labels as the container moves through the apparatus. Sensing arrays comprising photodetectors detect the reflectivity values of pixels on each label. For example, as will be explained in connection with the preferred embodiment of the invention, there may be eight photodetectors in each array each of which measures the reflectivity value of eight areas or pixels across the label as the container moves past the array. With eight photodetectors in vertical alignment each measuring the reflectivity value of eight pixels, there are a total of 64 pixels for each label. The photodetectors are arranged and the increments of measurements are such that the $8\times8$ pixel matrix extends over substantially the entire label for complete label coverage and detection.

In brief, the inspection apparatus of this invention studies the reflectivity characteristics of a statistical sample population of containers and then judges the following containers by the values obtained and rules set forth in its program. It has an "inspection" mode and a "detection" mode, each of which includes a "learn cycle". In the learn cycle the device studies a sufficiently large statistical sample of containers to correctly represent the population of containers to be inspected. Each label of the container samples is read, i.e., the reflectivity values measured for each pixel of each label, and from this the apparatus computes the means and three standard deviations for each pixel or photodetector for the sample labels. The means are computed by taking the sums of pixel or average photodetector readings and dividing by the number of containers sampled. These values represent the average light reflectivity for each reading point or pixel in the case of the "inspection" mode, or the average light reflectivity for each photodetector in the case of the "detection" mode. The means values are stored in a table. The three standard deviations are also computed and these values are retained in another table. The three standard deviations value when added to the means value forms an upper limit for the reflectivity for that pixel or for that detector, and when substracted from the means value forms the lower limit for that pixel or for that detector. Statistically, these limits should contain 99.7% of the samples in a normal population (production run) of bottles.

Once these limits are established from the samples in the learn cycle, they are used to determine the acceptability of the containers that follow. As each container passes through the label inspection apparatus, each pixel or eye (detector) is scored. If all of the pixels or eye readings are within the limits determined by the means plus and minus the three standard deviations then the container is allowed to pass. If a pixel or eye is outside of the limits, it is scored with a number representing how far it is outside those limits. The manner of scoring may be selected depending on how strict or liberal the inspection is to be. For example, a label can be failed if only one pixel or eye is outside the limit, or it may require that an individual pixel or eye error exceed the limit by a certain amount or that there be a limit on the total errors per label, or a combination of these.

Hence it is a primary objective of this invention to provide a label inspection apparatus that is easy to operate, relatively inexpensive, and that reliably simulates a casual visual inspection that an average person might give the container. The invention further provides such an apparatus that is easily adaptable for use with highly reflective labels such as those made of metal foil or metalized paper.

DETAILED DESCRIPTION OF A PREFERRED EMBODIMENT

Figure 1:
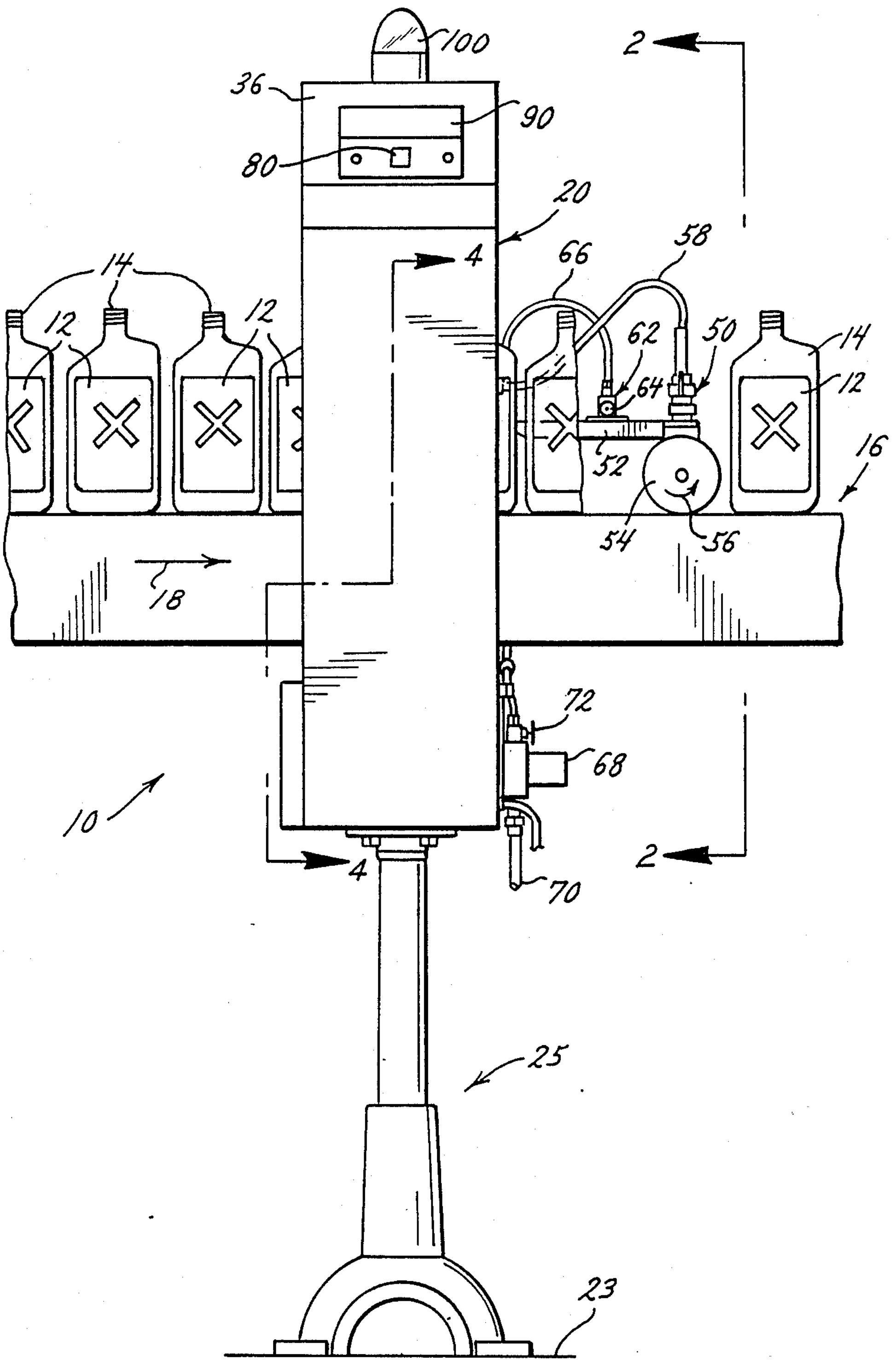
FIG. 1 is a front elevation view of a label inspection apparatus in accordance with the present invention.
Figure 2:
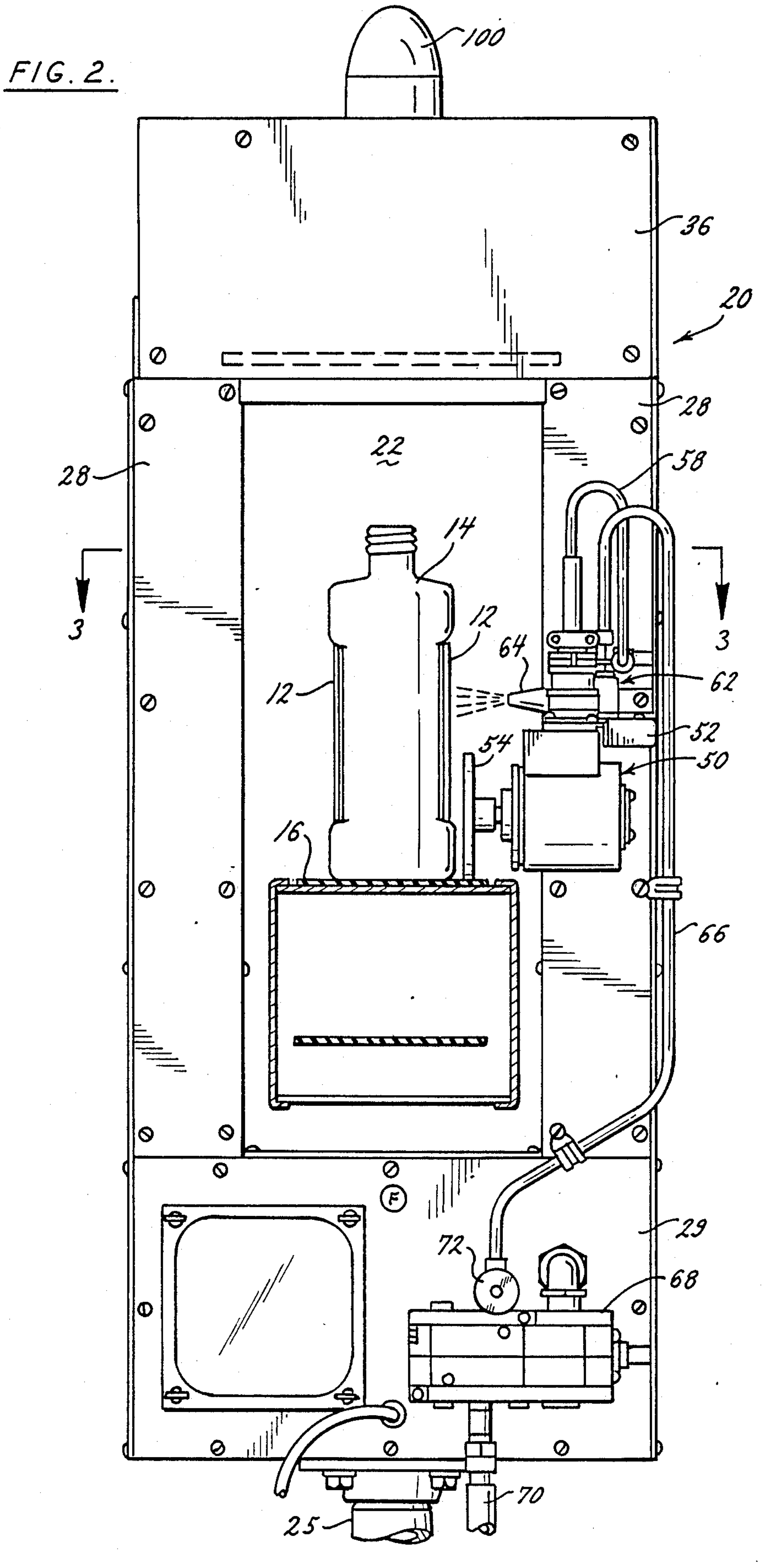
FIG. 2 is an enlarged view in section taken generally along the line 2—2 of FIG. 1.
Figure 3:
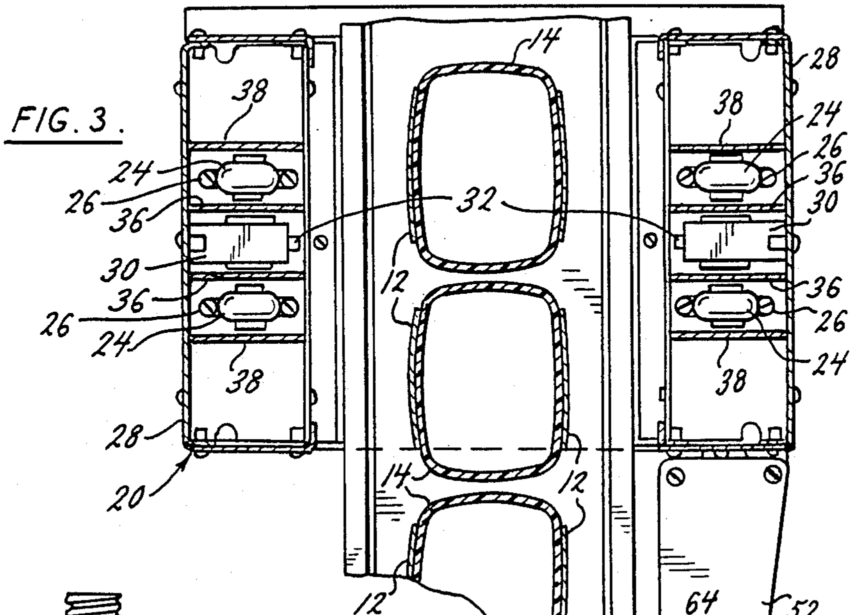
FIG. 3 is a view in section taken generally along the line 3—3 of FIG. 2.

With reference to the drawing the label inspection apparatus 10 of the present invention is for inspecting labels 12 affixed to the sides of containers 14 preferably of a type previously described. The inspection takes place automatically as the containers or bottles 14 are moved by a conveyor 16 such as in the direction shown by the arrow 18 of FIG. 1. As shown in FIGS. 1 and 3, the containers are positioned one directly behind the other as they are moved along by the conveyor. The conveyor is a flat belt conveyor either directly driven by a gear motor or through a V-belt drive. It must be quiet and smooth operating. The containers should pass through the center of the label inspection apparatus with each container stable and in the same orientation as its predecessor. Preferably the containers should be guided by suitable side rails (not shown) that do not touch the labels but that are so arranged that they release the containers in the same general orientation just before entering the label inspection area. The containers should be released from such guides a sufficient distance before the label inspection apparatus so as to insure that the containers are not bouncing or rocking as they reach the inspection location. By way of example the conveyor speed may be from under 100 to 600 containers per minute with the containers spaced with three inch clearance at the lower speed with the spacing increasing in a linear fashion to six inches at the upper speed.

The label inspection apparatus 10 includes an upper housing 20 having a rectangular opening 22 through which the conveyor 16 extends and the containers 14 move. The housing 22 is supported from the floor 23 of the plant where the conveyor line is located by a suitable stand 25. The upper housing 20 supports the various electrical and mechanical components that comprise the apparatus.

The apparatus is capable of inspecting containers with labels on either one side or both sides. Hence, some components are duplicated on both sides of the upper housing. Illumination lamps 24 in sockets 26 are located within the sides 28 of the upper housing to illuminate both sides of the containers and the labels thereon. It has been found to be important and much preferred that these lamps be of the fluorescent type. They may be U-shaped and should be chosen such that their output spectrum compliments the spectral response characteristics of the photodetectors located in the sensing arrays to be described. For example, if the photodetectors used are more responsive at the long-wave end of the visible light spectrum, it is preferable to use lamps high in output at the short-wave end of the visible spectrum to provide a more even visible spectrum illumination. Moreover, to provide a very stable illumination the lamps should be powered with direct current instead of alternating current. The output of an alternating current powered fluorescent lamp may vary typically 30% from instantaneous current peak to valley depending on the persistence of the phosphor compound coating the interior of the lamp and the frequency of the AC power. As the photoconductors and the electronics used in this embodiment of the invention have a response time of only a few microseconds, and a change in illumination of 0.4% would be recorded, the lamps should be DC powered. Hence, a suitable DC power supply (not shown) is located in a compartment 29 at the lower end of the housing 20 to power the lamps.

Also at both sides of the housing are photodetector arrays 30. Each array is located between the two lamps 24 at each side of the housing. Each array 30 has a plurality of vertically aligned photodetectors 32. In this preferred embodiment of the invention eight such photodetectors are included with each array to provide full vertical coverage of the label. By way of example, the photodetectors may be General Electric #14G1 NPN phototransistors mounted in a vertical line on one half inch centers. Each photodetector is equipped with a clear glass condensing lens that provides the photodetector with a nominal one half inch diameter field-of-view at two inches from the lens. The purpose of so mounting is to give good coverage of the label area as it passes the array with a minimum of sensors.

The outputs from the photodetectors are connected to a microprocessor unit located within an upper compartment 36 of the housing. The microprocessor unit includes control software to be further described, and suitable hardware as well known in the art. More specifically, the outputs from the photodetectors are connected to amplifiers the outputs of which are connected to the inputs of an analog-to-digital converter. Two such converters are used, one for each array. Each converter provides a continuous 8 bit digital conversion into an internal dual-ported 8-byte addressable random-access memory. The results of the digital conversions are directly available to the microprocessor without delay.

The microprocessor may be of a type commonly known as a Z-80. It may be complimented by a four channel counter timer, a dual channel serial communications interface, sufficient programmable read-only memory (PROM) to hold all necessary machine instructions, and adequate random access memory (RAM) for temporary data and other storage. One 8-bit hardwired output port and three 8-bit hardwired input ports are included for miscellaneous machine control purposes. These components are identified by way of example only as they are commonly known in the art and other microprocessors and associated components could also be used. Of course also required is a suitable power supply for powering the electronics as is well known in the art.

The current in the photodetectors may be affected adversely by changes in their temperature. For this reason the sensor arrays 30 are separated from the lamps 24 by baffles 36. Other baffles 38 are located outwardly of the lamps. Forced air originating from a fan and filter (not shown) mounted in the compartment 29 passes through holes in lamp mounting plates 40 at the tops of plenums 42 and into the spaces occupied by the lamps and sensor arrays to cool the arrays and lamps and aid in removing foreign matter that might otherwise settle and cling to the lamps. The baffles 36 help protect the arrays from the heat of the lamps.

The movement of the conveyor is monitored by an incremental encoder assembly 50 mounted at the end of an arm 52 extending from the housing. The encoder has a wheel 54 that rests on the conveyor and rotates in the direction of the arrow 56 when the conveyor moves from left to right as viewed in FIG. 1. The encoder assembly sends an electrical pulse through a cable 58 to the microprocessor unit for each small increment of conveyor travel. In this embodiment of the invention the increment may be approximately 0.0098 inches. Other increments could be used, the minimum being related to the speed capability of the microprocessor hardware and the maximum being related to the label width. Operation of the apparatus is controlled in response to the encoder pulses so that the operation is not dependent on conveyor speed. Reasonable variations in conveyor speed do not affect the operation of the apparatus.

Figure 4:
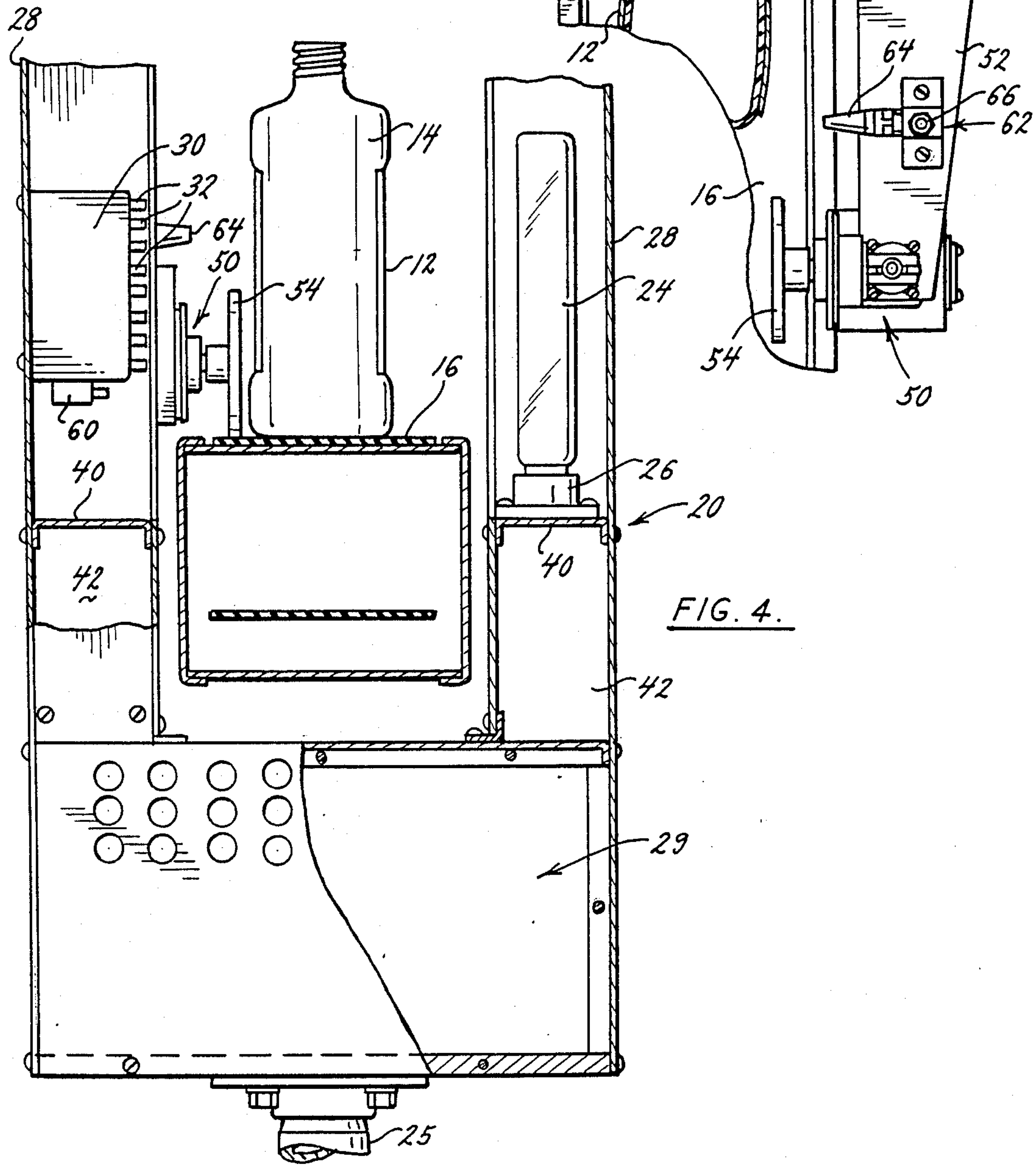
FIG. 4 is an enlarged view in section taken generally along the line 4—4 of FIG. 1.

In addition to the sensor arrays 30 there is another photodetector 60 (FIG. 4) located at the bottom of one of the sensor arrays and so mounted and directed that it receives almost all of its illumination from lamp 24 that is the upper right hand lamp as viewed in FIG. 3. The signal from the photodetector 60 is fed to an amplifier/-comparator on the microprocessor unit. The photodetector or sensor 60 detects the presence of the leading edge of a container as it enters the inspection apparatus. This sensing initiates certain functions to be described to inspect the labels on that container.

The apparatus of this invention also includes a device for ejecting containers that fail the inspection. The ejector 62 comprises a nozzle 64 mounted to the top of the arm 52 and which receives a supply of air through a tube 66 from a valve 68 located outside of the compartment 29. The valve receives air through a hose 70 from a suitable compressed air source within the plant. The valve 68 is electrically operated in response to control signals from the microprocessor unit. If a container fails inspection, the microprocessor generates signals to operate the valve 68 at the appropriate time such that air is released through the nozzle against the side of the failed container to eject that container from the conveyor line. The nozzle should be located and the operation of the valve 68 should be timed such that the blast of air from the nozzle strikes at a centralized location at the side of the container swift and complete ejection of the container, restrictor valve 72 provides adjustment for the amount to the nozzle.

Operation

In its preferred the apparatus operates in two modes: an "inspection" mode and a "detection" mode depending types of labels to be inspected. Each mode includes a "LEARN" cycle. The operation will first be in the inspection mode.

The containers with on both sides, the condition and position of are to be inspected, are moved by the conveyor through the inspection apparatus. This movement is monitored by the encoder 50 that outputs electric pulses to the microprocessor unit for each small increment of conveyor travel. As a container enters the apparatus, its presence is first detected by the reduction of illumination on photodetector 60. This reduction of illumination is caused by the interposition of a leading edge of the container between the photodetector 60 and the lamp 24 at the other side of the container. This initiates certain functions be described.

To begin inspection the operator presses a button 80 called the "LEARN" button, whereupon the apparatus initializes all devices to a known state, clears all counters and sets certain operating parameters into memory. These parameters are determined by the connection of jumpers at input register which are read by the microprocessor. Two 128 entry summation arrays in RAM, designated SUMS and SQRS to zeros.

The apparatus also "measures" two containers before proceeding in the LEARN cycle. The purpose of the first "measurement" is to sensor eyes. The second container is measured to locate the leading and trailing edges of the container then define the label area and divide the container into equal increments so that the photodetectors of sensor arrays can read the label at equal increments the entire label. In this preferred embodiment the label is divided into 64 pixels in an $8\times8$ matrix there are eight vertical rows of pixels equally spaced across the width of the label.

Figure 5:
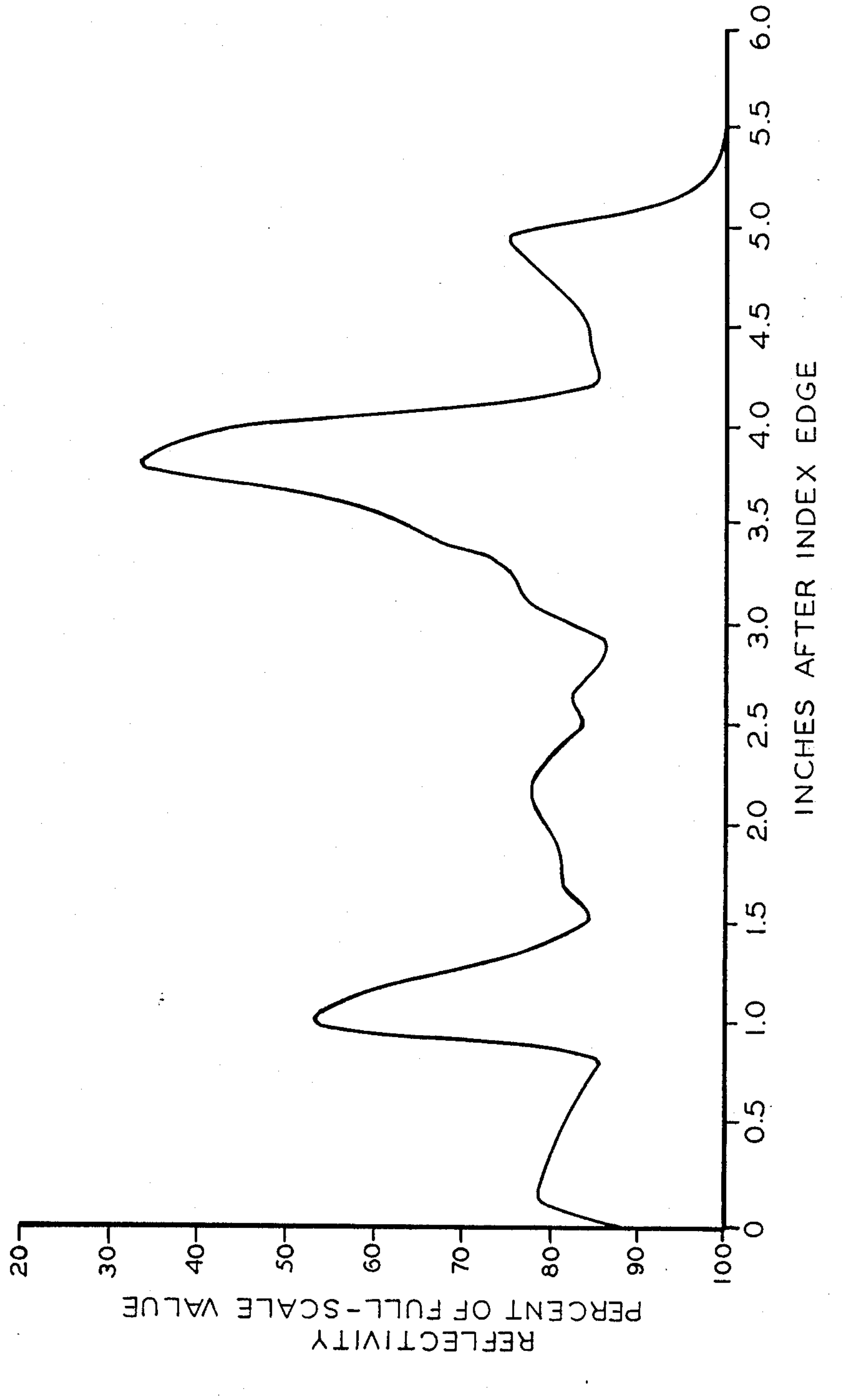
FIG. 5 is a plot of reflectivity values for a particular bottle and label.

To explain how the microprocessor locates these pixel readings reference is to the graph of FIG. 5 which shows the average reflectivity of a particular bottle with a particular label as it moves past the sensor array. It is a one quart bottle with a silver metalic label. The plot represents an average of the eight photodetectors with the average value taken at each encoder pulse starting with the detection of a leading edge of the container by the photodetector 60. The slope A, representing a sharp increase in reflectivity, corresponds to the leading edge of the container sensed by the array. The sharply decreasing slope at B represents the trailing edge of the container as detected by the array. The microprocessor unit uses the encoder count at the slope A and the encoder count at the slope B to measure of the bottle width. In this described embodiment with this type label, the microprocessor unit looks for the most sharply increasing slope between the encoder pulse numbers 70 and 130 (approximately 0.7 inches and 1.3 inches on FIG. 5), and the most sharply decreasing slope following the highest peak after the encoder pulse number 250 (approximately 2.5 inches on FIG. 5) as representing the leading and trailing edges, respectively, of the container. The encoder counts corresponding to these slopes are then used to calculate the "lead" value which is the number of encoder counts from the detection of the leading edge of the container by the photodetector 60 to the first row of readings by the sensor array, and the "increment" value which is the number of encoder counts between successive rows of readings by the sensor array. The numbers 70, 130 and 250 have been found to work successfully in view of the similar characteristics of labels of this type. For other labels other numbers or plot characteristics may be used for locating the pixel readings.

Hence, the increment value is derived by subtracting the leading edge count from the trailing edge count and dividing by nine. This will result in eight reading locations or pixels on the label for each photodetector in the array at equal increments across the label.

Having "measured" the container to locate the pixel readings across the container relative to the container's leading edge, the apparatus enters the LEARN cycle as indicated by the display panel 90. In this cycle the apparatus "learns" the limits on which the acceptability of the containers are to be judged. It learns these limits by sampling acceptable containers. This means that the operator should visually inspect the sample containers to be sure that unacceptable containers are not included in the sampling as otherwise the limits will be improperly set and ultimately unacceptable containers will not be ejected. In this preferred embodiment 64 containers are sampled in the LEARN cycle. This number was selected to provide a sufficiently large statistical sample for the results of the calculations to be meaningful and therefore correctly represent the population of containers to be inspected. A somewhat smaller or a greater number could be used.

As each container in the sample passes through the apparatus, the eight photodetectors in each array read a total of 64 pixels with each sensor reading eight pixels across the width of the label at equal increments. For the "inspection" mode the reflectivity values of each of 64 pixels on each label from 64 containers is measured by the photodetectors in each array. The microprocessor unit computes the means and three standard deviations value for each pixel location on the 64 labels. The means values are computed by summing the 64 sampled reflectivity values for each pixel location and dividing by 64. Hence, after the sampling there is computed a mean value for each pixel location within the matrix based on a 64 container sampling. Each mean value represents the average light reflectivity for each reading point or pixel location. Also, the three standard deviations value is computed for each pixel location. The result is a table of averages stored in RAM called MEANS and another table of numbers stored in RAM called DEVS representing values (in statistics called three standard deviations) that, when added to the corresponding values in the MEANS table, form an upper limit for the reflectivity of the label in that pixel. That same three standard deviations value when subtracted from the corresponding means value defines the lower limit of reflectivity in that pixel. Statistically, these limits should contain 99.7% of the samples in a normal population (production run) of containers.

After sampling the containers in the LEARN cycle, the microprocessor unit compares the three standard deviations value in each pixel of the sample with an internal limit which may be for example 31 decimal. If any three standard deviations value falls outside this limit, the LEARN cycle is rejected as being invalid. The operator initiates another LEARN cycle until a valid LEARN cycle is obtained, thus assuring that valid limits are established for the actual inspection of bottles after the LEARN cycle.

After a valid LEARN cycle has been obtained, the apparatus is ready to actually inspect bottles. The bottles are inspected in the same way as the samples are inspected with the photodetectors reading 64 pixels on each label. The reflectivity value of each pixel is compared with the means plus and minus three standard deviations limits established in the LEARN cycle. If all of the pixels fall within the limits the label passes inspection. If one or more pixels fall outside the limits, then whether the label passes or fails inspection depends on the established scoring. Two preferred methods of scoring are to place a limit on the size of an individual pixel or detector error, and a limit on the total errors per label. The operator has the option of selecting various types of scoring to determine pass or fail depending on how strict or lenient he wishes the inspection to be. This is selected by the operator by means of jumpers at input registers of the microprocessor unit.

There are many possible scoring techniques. One example is to assign a unit value for each pixel reading outside the limit of means plus or minus three standard deviations but within a limit of means plus or minus six standard deviations. Twice the unit value would be assigned where a pixel reading is greater than means plus or minus six standard deviations but less than means plus or minus nine standard deviations, and so on. These unit values can then be used in a variety of ways to determine whether to pass or fail a bottle. For example, it may be appropriate for a particular label that it be rejected if any one pixel value equals or exceeds four times a unit value, and further that the label should also be rejected if the sum of all the unit values for all of the pixels on the label is more than four. This is only one example and it is to be understood that there are many variations on scoring depending on the type of label and on how strict or lenient the inspection should be. It has been found that paper labels exhibit different failure modes than do heat-transfer labels. It has been found that with paper labels if the allowed pixel error factor is set to equal the allowed total label errors, more variation in background color of the paper label will be tolerated while still ejecting the badly misplaced or missing label. On heat-transfer labels it is desirable to eject those containers having paneling problems and holes burned in the label so that a lower limit on the per pixel error is preferred.

The "detection mode" is preferred for bottles having highly reflective labels such as those made of metal foil or metalized paper. With such labels a small air bubble under the label at a given pixel location can cause the standard deviation to vary beyond limits that the system can accept in the "inspection" mode. The "detection" mode allows larger changes in reflectivity caused by an air bubble or a paneled container but still ejects a missing, skewed or folded label.

In the "detection" mode the pixel readings across the label by each photodetector in an array are first averaged both in the LEARN cycle and then during actual inspection of the labels. Preferably, to reduce the influence of noise, each pixel reading is taken four times for a total of 32 readings per photodetector in the array representing eight pixels. These 32 readings are then divided by 32 to compute an average reading for each photodetector for each label. These average readings are then used to calculate the means and three standard deviations based on a sampling of 64 containers just as in the "inspection" mode. After the LEARN cycle containers are then inspected in the same way with the 32 readings of each photodetector being first averaged and that average compared with the limits established during the LEARN cycle in this mode.

Thus in the "inspection" mode each pixel value is compared to a limit established for that pixel value, while in the "detection" mode the average value for a photodetector is compared with limits established for that photodetector value.

The apparatus can be made to operate automatically to try first the "inspection" mode, and if it fails in the LEARN cycle, then automatically enter the "detection" mode, or the operator can select a particular mode by connecting appropriate jumpers.

The apparatus also includes an alarm light 100 to indicate that a certain percentage of labels are failing, or that the LEARN cycle has failed, or other alarm conditions as may be established.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A label inspection apparatus for inspecting labels on containers such as, for example, containers of generally rectangular horizontal cross-section in the label areas and where the labels are applied to generally flat or slightly convex as opposed to round side surfaces of the container, and further where the containers with the labels to be inspected are moving by a conveyor past the inspection apparatus in an upright position, said label inspection apparatus comprising:

means for sensing the reflectivity values of pixels located over substantially the entire label for each container in a sample having a predetermined number of containers, the pixel locations being the same for each label in the sample and each label to be inspected, the containers and labels in the sample being typical of those to be inspected, means for establishing MEANS reflectivity values from the reflectivity values of each pixel location for the containers in the sample, means for determining standard deviation values from the number of containers in the sample and the reflectivity values, means for establishing limits by which containers to be inspected are to be judged as pass or fail, said limits established as a function of said MEANS values and standard deviation values, means for inspecting labels on the containers to be inspected, including means for sensing the reflectivity value of each pixel in each label as with the containers in the sample, means for comparing values which are a function of the sensed values with the established limits, and means for passing or failing a label in response to said comparison.

2. The apparatus of claim 1 wherein said limits are MEANS plus and minus three standard deviations.

3. The apparatus of claim 2 wherein said means for passing or failing a label further comprises scoring the amount by which said compared values exceed said limits, and failing a label if its score exceeds a predetermined score.

4. The apparatus of claim 2 wherein said means for passing or failing a label further comprises scoring the amount by which said compared values exceed said limits and the number of said compared values for said label that exceed said limits, and failing said label if its score exceeds a predetermined score.

5. The apparatus of claim 1 further comprising means for automatically ejecting containers from the conveyor that fail inspection.

6. The apparatus of claim 1 wherein said sensing means further comprises photodetectors, and wherein said apparatus further comprises lamps for illuminating the labels as the containers move past the apparatus, said photodetectors sensing the reflectivity at each pixel location for each label as it moves past the apparatus.

7. The apparatus of claim 6 wherein said lamps are of the fluorescent type and are DC powered.

8. The apparatus of claim 1 further comprising an encoder for generating electrical pulses for each increment of movement of the conveyed containers past said apparatus, and means in response to selected said pulses for establishing the increments between pixels across the width of each label inspected.

9. The apparatus of claim 8 further comprising a detector for detecting a leading edge of each container as it enters said apparatus, means for counting encoder pulses in response to said detector detecting said leading edge, means for determining the pulse counts when said sensing means senses the leading and trailing edges of a container, and means for establishing the increments between pixels across the width of each label inspected from said pulse counts representing the leading and trailing container edges.

10. The apparatus of claim 1 wherein said pixels form a matrix over the label area, and said sensing means further comprises a plurality of sensors spaced vertically over substantially the entire height of the label area, each sensor sensing the reflectivity values of pixels spaced horizontally at substantially equal increments.

11. The apparatus of claim 1 wherein said apparatus is microprocessor based.

12. A label inspection apparatus for inspecting labels on containers such as, for example, containers of generally rectangular cross-section in the label areas and where the labels are applied to generally flat or slightly convex as opposed to round side surfaces of the containers, and further where the containers with the labels to be inspected are moving by a conveyor past the inspection apparatus in an upright position, said label inspection apparatus comprising:

a housing supported relative to the conveyor such that the containers to be inspected move past the housing, a microprocessor unit, a detector for detecting the leading edge of each container as it moves past the apparatus and for sending a signal to said microprocessor in response to detecting said leading edge, a sensor array supported by said housing, said array including a plurality of sensors spaced vertically one from the other at equal intervals over substantially the entire height of the labels to be inspected, each sensor sensing the reflectivity values of a plurality of pixels spaced substantially at equal increments across substantially the entire widths of the labels, whereby the sensors sense the reflectivity values of the pixels spaced substantially over the entire label, said pixel locations being the same for each label of those to be inspected, said microprocessor unit receiving signals from said sensors representing said pixel reflectivity values, lamps for illuminating each label as it is sensed by said sensors, means in a LEARN cycle for sensing the reflectivity values of said pixels for each label in a sample of containers, said sample having a predetermined number of containers, said sample containers and their labels being typical of those to be inspected, said microprocessor unit in accordance with its operating program establishing MEANS reflectivity values from the reflectivity values of the pixels for the containers in the sample, and determining standard deviation values from the number of containers in the sample and the reflectivity values, means for establishing limits by which containers to be inspected are to be judged as pass or fail, said limits established as a function of said MEANS values and standard deviation values, means for sensing the reflectivity value for each pixel of each label to be inspected as with the sample, means associated with said microprocessor unit for comparing values which are a function of the sensed values with said established limits, and means associated with said microprocessor unit for determining the pass or fail of each label to be inspected in response to said comparison.

13.

The apparatus of claim 12 further comprising an encoder for generating electrical pulses for each increment of movement of the conveyed containers past said apparatus, said pulses being transmitted to said microprocessor unit, and means associated with said microprocessor unit for establishing increments between pixels across the width of the labels in response to selected ones of said pulses.

14. The apparatus of claim 13 further comprising an ejector for ejecting containers from the conveyor, and means responsive to said microprocessor unit determining a label as failed to actuate said ejector to eject the container with said failed label from the conveyor.

15. The apparatus of claim 14 wherein said ejector emits a blast of air against a failed container in response to signals from the microprocessor unit to eject a container with a failed label.

16. The apparatus of claim 12 wherein said limits are MEANS plus and minus three standard deviations.

17. The apparatus of claim 16 wherein said means for passing or failing a label further comprises scoring the amount by which said compared values exceed said limits, and failing a label if its score exceeds a predetermined score.

18. The apparatus of claim 16 wherein said means for passing or failing a label further comprises scoring the amount by which said compared values exceed said limits and the number of said compared values for said label that exceed said limits, and failing said label if its score exceeds a predetermined score.

19. The apparatus of claim 12 wherein said sensing means further comprises photodetectors, and wherein said apparatus further comprises lamps for illuminating the labels as the containers move past the apparatus, said photodetectors sensing the reflectivity of said pixel locations for each label as it moves past the apparatus.

20. The apparatus of claim 19 wherein said lamps are of the fluorescent type and are DC powered.

21. The apparatus of claim 13 further comprising means associated with said microprocessor unit for counting encoder pulses in response to said detector detecting said leading edge, means for determining the pulse counts when said sensing array senses the leading and trailing edges of a container, and means associated with said microprocessor unit for establishing the increments between pixels across the width of each label inspected from said pulse counts representing the leading and trailing container edges.

22. The apparatus of claim 12 wherein said pixels form a matrix over the label area.

* * * * *